United States Patent [19]

Nelson et al.

[11] Patent Number: 4,890,413
[45] Date of Patent: Jan. 2, 1990

[54] FLOATING FISH CONTAINER WITH ADJUSTABLE LENGTH MEANS AND BIASED OPENING MEANS

[76] Inventors: Daniel E. Nelson; Mickey C. Nelson, both of 417 Herschel, St. Paul, Minn. 55104

[21] Appl. No.: 305,691
[22] Filed: Feb. 3, 1989
[51] Int. Cl.[4] .............................................. A01K 97/04
[52] U.S. Cl. ............................................ 43/55; 43/56
[58] Field of Search ............................ 43/55, 56, 54.1

[56] References Cited

U.S. PATENT DOCUMENTS

| D. 254,503 | 3/1980 | Belasquez | 43/55 |
|---|---|---|---|
| D. 257,377 | 10/1980 | Andrews | 43/55 |
| 1,110,892 | 9/1914 | Cather | 43/55 |
| 1,841,956 | 1/1932 | Juergens | 43/55 |
| 2,603,028 | 7/1952 | Roberts | 43/55 |
| 2,720,049 | 9/1953 | Basky | 43/55 |
| 2,739,410 | 10/1953 | Budnick | 43/55 |
| 2,968,887 | 1/1961 | Woolworth | 43/55 |
| 3,000,132 | 1/1960 | Koistinen | 43/55 |
| 3,478,463 | 11/1969 | Ruter | 43/55 |
| 3,524,278 | 8/1970 | Wolfe | 43/55 |
| 3,717,124 | 2/1973 | Jacobs | 43/55 |
| 3,919,803 | 11/1975 | Manguso | 43/55 |

Primary Examiner—Nicholas P. Godici
Assistant Examiner—Michael William Starkweather
Attorney, Agent, or Firm—Burd, Bartz & Gutenkauf

[57] ABSTRACT

A floating fish holding container has flexible open mesh fabric side, top and bottom walls surrounding a chamber for accommodating fish in water. A top ring having buoyant material attached to the top of the side wall floats the container in a body of water. A bottom ring attached to the bottom of the side wall maintains the cylindrical shape of the container in the water. The top wall has an opening into the chamber that is biased to an open position with elastic cords. A draw string is used to close the opening. A releasable locking device on the draw string holds the top wall in the closed position. When the locking device is released the elastic cords automatically open the opening. A plurality of strings mounted on the side walls are used to adjust the length of the side wall to allow the container to float in shallow water without contacting the bottom or weeds in the body of water.

32 Claims, 5 Drawing Sheets

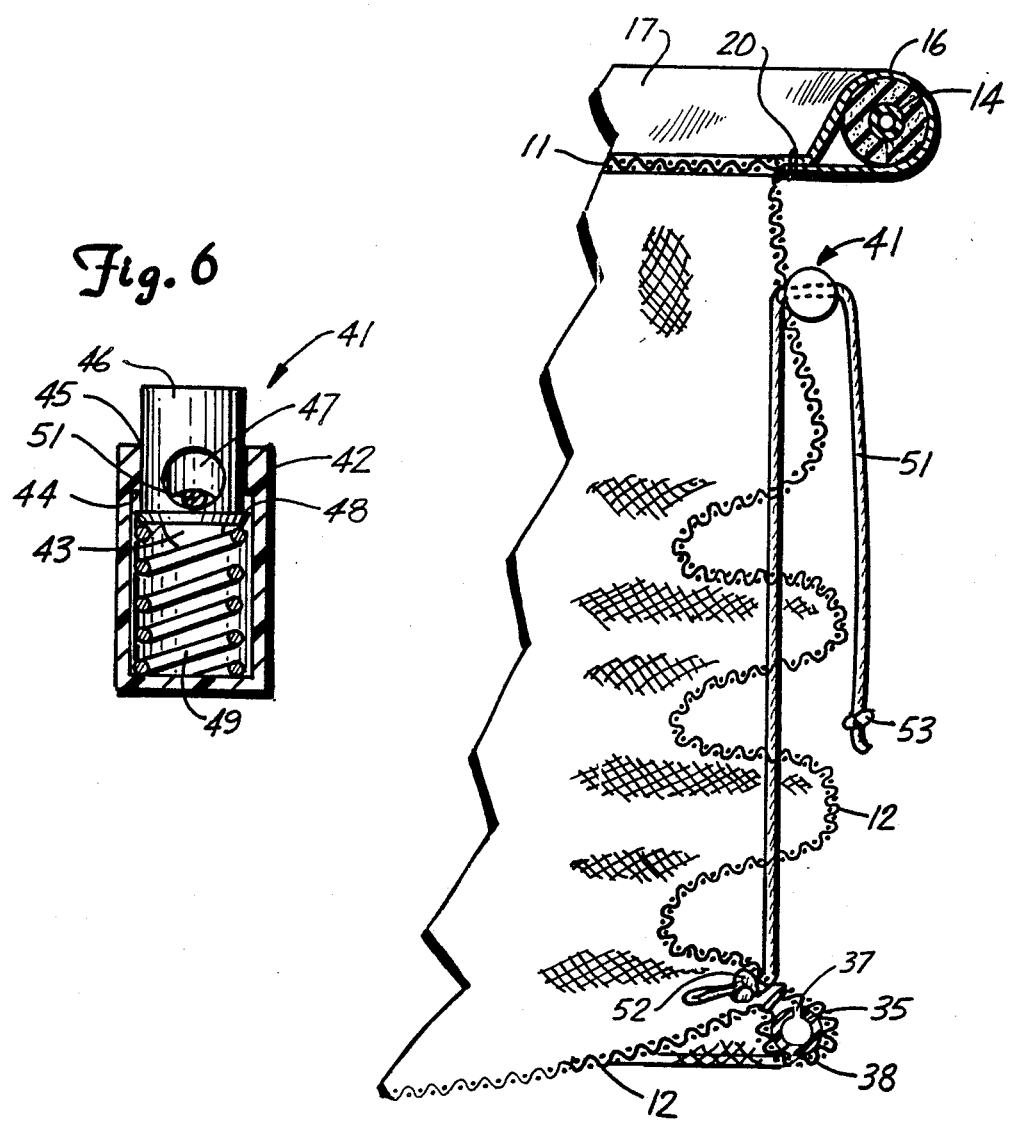
Fig. 6
Fig. 5
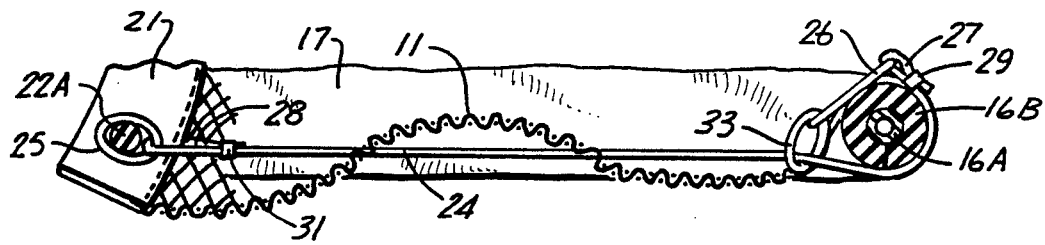
Fig. 7

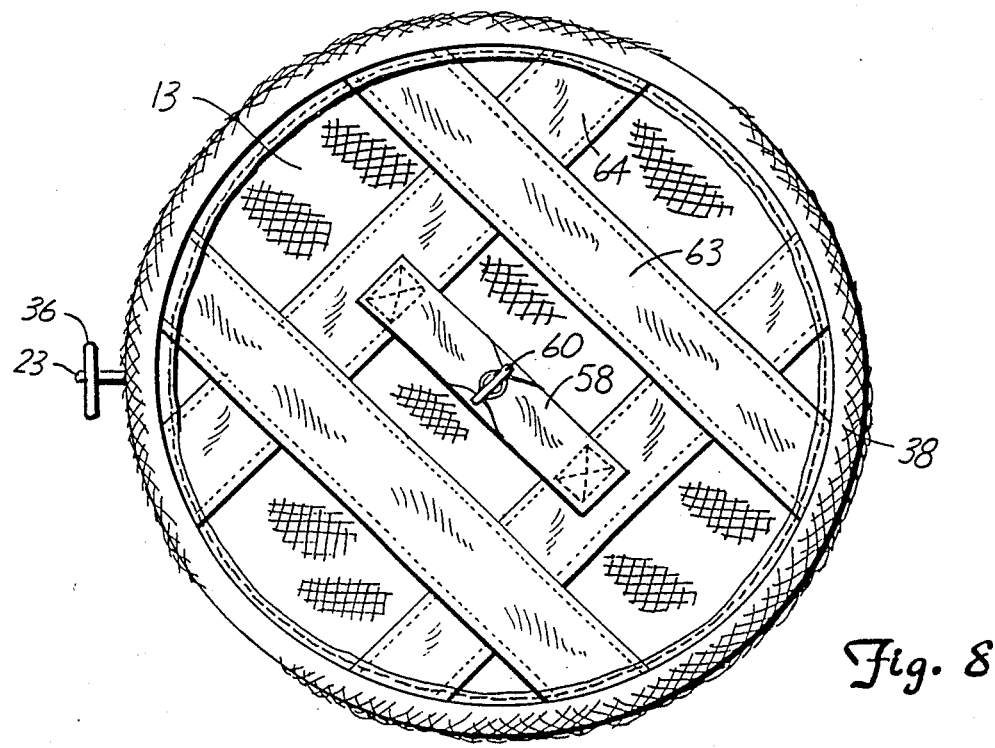

4,890,413

FLOATING FISH CONTAINER WITH ADJUSTABLE LENGTH MEANS AND BIASED OPENING MEANS

BACKGROUND OF THE INVENTION

The invention relates to fish live wells, particularly collapsible floating fish containers. Fish are caught and placed in the receptacle to restore them to the water but confine them so that they cannot escape. In this manner the fish can be kept alive and fresh for long periods of time.

Prior fish containers have a ring of buoyant material such as foam plastic, cork and the like. For example, Wolf, in U.S. Pat. No. 3,524,278, discloses a fish receptacle having a floating cover to keep the receptacle near the surface of the water. The container has collapsible wire mesh walls and a bottom peripheral ring. The bottom of the container has a door that swings inwardly to release the fish. Juergens, in U.S. Pat. No. 1,841,956, discloses a fish basket having flexible net walls with an open top and a closed bottom. An inflatable tube located near the top of the basket keeps the basket afloat. The top of the basket is closed by pulling a draw string. A knot is tied in the draw string to hold the top of the basket in the closed position.

The prior fish containers have had many problems and deficiencies. One problem is that the containers cannot be easily and quickly opened after a fish is caught. When a large struggling fish is caught, often only one hand of the fisherperson is free to open the fish basket. The fish may become lost or damaged while the container is being opened. Another problem arises when the containers are used in shallow water. Submerged logs, rocks and other bottom structure engage and snag the containers. It is time-consuming and inconvenient to untangle the fish containers from the bottom structure. Also, the prior containers do not have any means to allow them to be submerged several feet below the surface of the water. Fish in the containers are held in warmer less oxygenated surface water which could result in damage or early death of the fish.

SUMMARY OF THE INVENTION

The invention is directed to a collapsible floating fish container adapted to hold large trophy fish in water having varying depths and bottom structure. The top of the container is easily and quickly opened and closed by operating a hand-held locking device. A swivel hook located on the bottom of the container accommodates an anchor to submerge the container.

The container has a bottom wall, side wall and an open top wall to define an inner chamber for accommodating fish. The top of the container is biased to an open position with elastic cords that extend between a top peripheral ring and the top inner edge of the top wall of the container. A draw string attached to the top wall of the container is operable to move the top wall of the container from the normally open position to a closed position. A locking device slidably mounted on the draw string is used to hold the string thereby retaining the top wall in the closed position when the string is pulled tight. When the lock is released, the elastic cords automatically move the top wall of the container to the open position whereby fish can be placed into and removed from the container.

The side wall of the container has a plurality of lift strings operable to move the side wall between an extended position and a retracted position. A locking device is slidably mounted on each string for holding the string and retaining the side wall in the retracted position. The locking device is releasable to allow the side wall to move to the extended position.

DESCRIPTION OF DRAWING

FIG. 5 is an enlarged sectional view taken along line 5—5 of FIG. 3;

FIG. 6 is an enlarged sectional view taken along line 6—6 of FIG. 1;

FIG. 7 is an enlarged sectional view taken along line 7—7 of FIG. 3; and

FIG. 8 is a bottom view of the floating fish container.

DESCRIPTION OF THE PREFERRED EMBODIMENT

Figure 1:
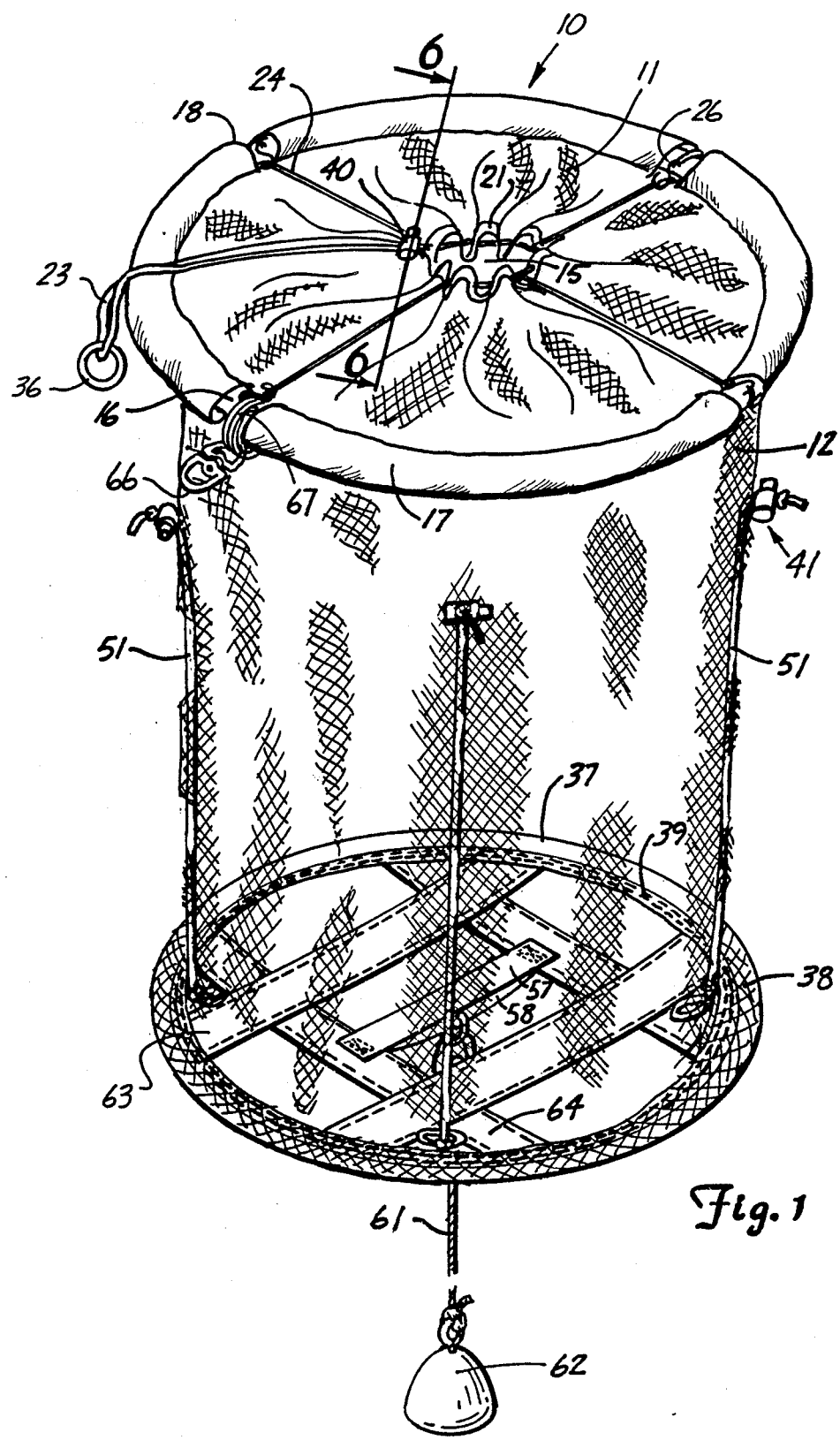
FIG. 1 is a perspective view of the floating fish container of the invention.

Referring to FIG. 1, there is shown a fish holding apparatus comprising a floating fish container of the invention indicated generally at 10, for accommodating fish in water. Container 10 is a generally cylindrical-shaped flexible bag having a top wall 11 with an opening 15. Fish are placed into and removed from container 10 through opening 15. The container 10 has a flexible circular side wall 12 joined to the top wall 11 and a bottom wall 13 to define an inner chamber. The top, side, and bottom walls 11, 12, and 13 are open mesh fabric, such as a nylon mesh fabric.

A tubular ring 16 is located adjacent the periphery of container 10 at the junction of top wall 11 and side wall 12. Ring 16 is accommodated by casing 17. Casing 17 has a plurality of fabric sleeves, such as nylon fabric, stitched to container 10 as shown at 20 in FIG. 5. Casing 17 is secured to the outer circular peripheral edge of top wall 11 and the upper end of side wall 12. The casing 17 has a circular passage for accommodating a top floatation ring 16. Referring o FIG. 7, ring 16 has a circular member shown as an inner plastic tube 16A and an outer circular member 16B of buoyant material, such as polyurethane foam. The outer member 16B surrounds inner member 16A to reinforce and maintain the circular shape of ring 16. The buoyant material has sufficient mass to keep the top of container 10 at the surface of the water 65, as shown in FIG. 2.

A second bottom tubular ring 35 is located adjacent the periphery of container 10 at the junction of the bottom wall 13 and side wall 12. Ring 35 is a plastic tube having a plurality of top holes 37 to allow water to flow into and air to escape from the tube. The adjacent ends of the tube are connected with a rod (not shown) that telescopes into the ends of the tube. A mesh casing 38 surrounds ring 35 to locate ring 35 around bottom wall 13. Casing 38 is stitched to container 10 as shown at 39 in FIG. 1. Ring 35 has a diameter substantially the same as the diameter of ring 16 giving the container 10 a cylindrical shape. The weight of ring 35 operates to submerge container 10 and maintain the cylindrical shape of side wall 12 in water 65. Ring 35 shown as a circular tube can be a solid circular rod of plastic, metal or like material.

Bottom wall 13, shown in FIG. 8, has a plurality of intersecting straps 63 and 64. Straps 63 and 64 reinforce bottom wall 13. A handle 57 extends between straps 64 on the inside of bottom wall 13 to facilitate lifting of bottom wall 13 by a fisherperson. An anchor support strap 58 extends between straps 64 adjacent handle 57 on the outside of bottom wall 13. A connector ring 60 mounted on strap 58 supports a swivel 59. An anchor 62, as shown in FIG. 1, can be tied to swivel 59 with a rope 61. Anchor 62 is of sufficient weight to submerge the entire container 10 several feet below the surface of water 65. This locates fish in the container in cooler more oxygenated subsurface water keeping the fish livelier and fresher for longer periods of time.

Figure 2:
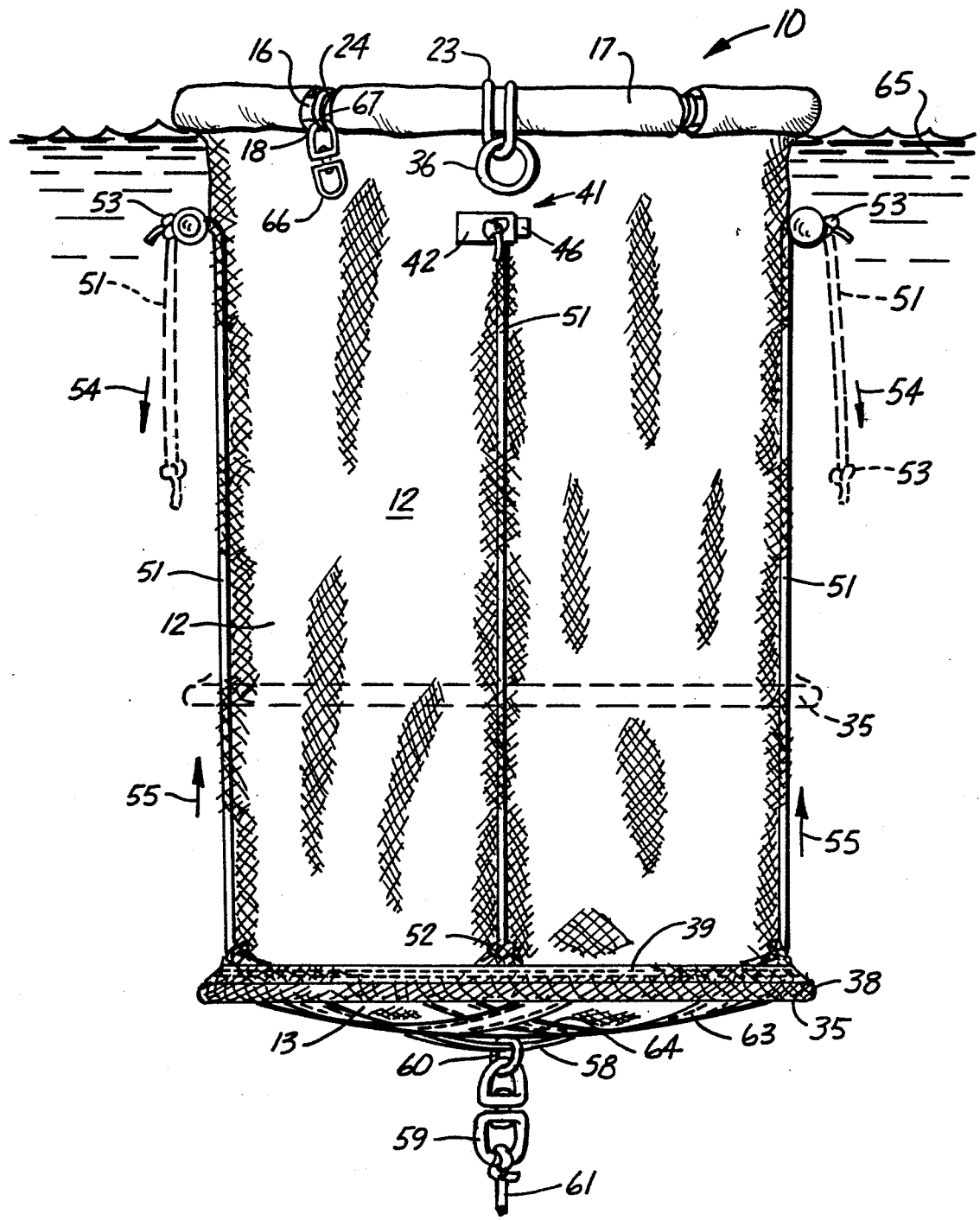
FIG. 2 is a side elevational view of the floating fish container in its extended position located in a body of water.

Referring to FIGS. 2 and 5, container 10 has a plurality of laterally spaced depth adjustment vertical cords or lift strings 51 threaded longitudinally through side wall 12. Strings 51 are operable to adjust the length or height of side wall 12 so that container 10 can be used in shallow water without the bottom wall 13 of the container engaging bottom structure. Pulling strings 51 in the direction shown by arrows 54 causes the bottom wall 13 of container 10 to move upwardly, as shown by arrows 55, and folding the side wall 12. This shortens the length of side wall 12, as shown by broken lines in FIG. 2.

Releasable locking devices, indicated generally at 41, are operable to hold the side wall 12 of container 10 in the retracted position. As shown in FIG. 6, locking device 41 has a cylindrical housing 42 accommodating a spring 49. An actuator button 46 slidably fits into a bore 45 in the top of housing 42. Spring 49 engages button 46 and the bottom surface of housing 42 to bias the button 46 outwardly. Button 46 has a lower lip 48 that engages shoulder 44 of housing 42 to retain the button 46 in the housing 42. Housing 42 has a transverse passage 43 that coincides with a passage 47 in button 46 when the button is depressed. String 51 is threaded through passages 43 and 47. Spring 49 normally biases the lower surface of passage 47 toward the upper surface of passage 43 to prevent movement of string 51 through locking device 41. When button 46 is depressed, passages 43 and 47 coincide allowing string 51 to move through locking device 41. To retract side wall 12 button 46 is depressed and string 51 is pulled through locking device 41 in direction of arrow 54. Button 46 is released thereby locking the position of string 51 in locking device 41. To extend side wall 12 button 46 is depressed aligning passages 43 and 47. The weight of ring 37 causes the string 51 to move back through locking device 41 thereby extending side wall 12. String 51 has knots 52 and 53 that keep the ends of string 51 from passing through side wall 12 and locking device 41. Shortening the length of side wall 12 enables the fisherperson to use container 10 in areas having shallow water. When fishing in deeper water the side wall 12 can be quickly and easily retracted by activating locking devices 41 to release strings 51.

Figure 3:
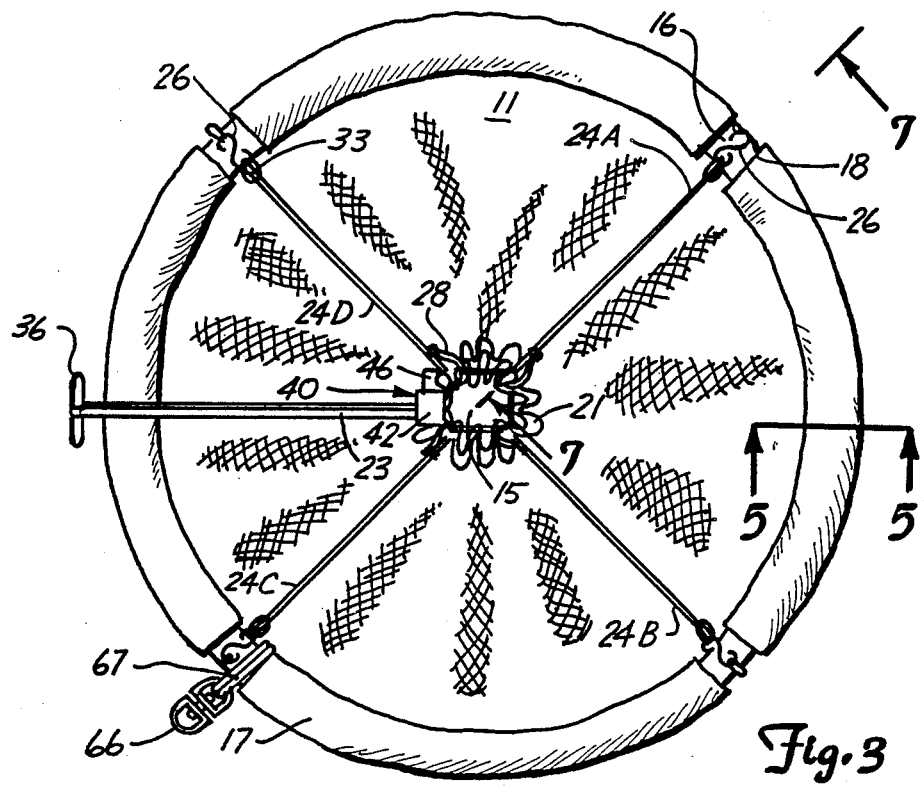
FIG. 3 is a top view of the floating fish container showing the top wall in the closed position.
Figure 4:
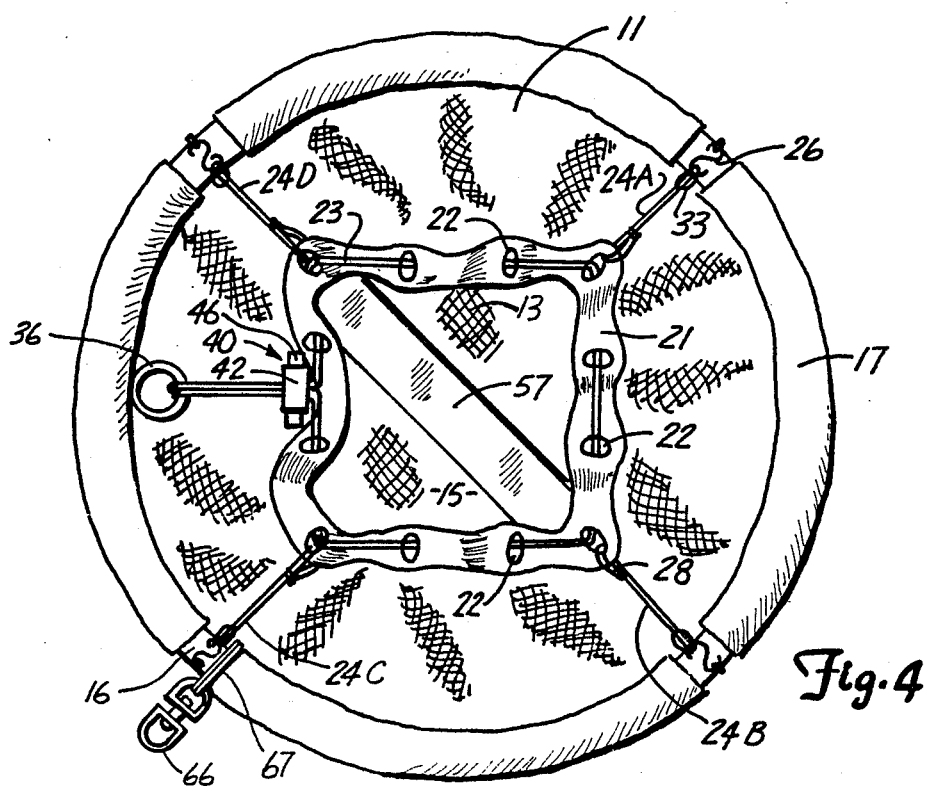
FIG. 4 is a top view similar to FIG. 3 showing the top wall in the open position.

Referring to FIGS. 3 and 4, the top wall 11 of container 10 has a flexible foldable strip or band 21 having a plurality of spaced holes 22 along the length of the strip. Strip 21 is a continuous band of fabric, such as nylon fabric. As shown in FIG. 4, strip has an unfolded length so that opening 15 can be expanded to a relatively large size to allow large fish to be placed into the holding chamber of the container. When opening 15 is contracted or closed, as shown in FIG. 3, strip 21 is held in a folded position by draw string 23. The mesh fabric of top wall 11 expands to allow strip 21 to be folded to the closed position, as shown in FIG. 3. Strip 21 is a band of fabric attached to the top inner edge of top wall 11 adjacent opening 15. A cord or draw string 23 is threaded through holes 22. When string 23 is pulled, strip 21 constricts to close opening 15, as shown in FIG. 3. Holes 22 are reinforced with metal rings or grommets 25 to prevent ripping and tearing of strip 21 when string 23 is pulled. A pull ring 36 is attached to the ends of string 23. Ring 36 can be placed on a hook mounted on a boat or a dock (not shown) to retain container 10 in proximity to the fisherperson.

A plurality of elastic cords 24A-24D connected to strip 21 and ring 16 bias top wall 11 of the container 10 to the open position. As shown in FIG. 7, the ends of each cord 24A-24D are doubled over and secured to the cord with clips 29 and 31 to form loops 27 and 28. Ring casing 17 has splits 18 that expose portions of ring 16. The splits 18 are laterally spaced around the perimeter of casing 17. The outer end of each cord 24 is threaded through a connector ring 33 and wrapped around an exposed portion of ring 16. A S-hook 26 connects loop 27 to a ring 33 to secure cord 24 to ring 16. Loop 28 extends through corner hole 22A of strip 21. Elastic cords 24A-24D are in tension when strip 21 is open as shown in FIG. 4. The elastic cords 24A-24D, being in tension, bias the corners of strip 21 toward ring 16 thereby increasing the circumference of opening 15 so that fish can be readily placed in the container 10.

Releasable locking device 40 is used to hold the container 10 in the closed position. Locking device 40 is the same as the locking devices 41 on adjustment strings 51. Locking device 40 is located on draw string 23 between strip 21 and pull ring 36. Locking device 40 has housing 42 that accommodates spring 49. Button 46 mounted in bore 45 of housing 42 is outwardly biased by spring 49. Passage 43 of housing 42 coincides with passage 47 of button 46 when the button is pressed inwardly. The ends of string 23 are extended through passages 43 and 47. Spring 49 biases the lower surface of passage 47 toward the upper surface of passage 43 to inhibit movement of string 23 through locking device 40. When button 46 is pressed, passages 43 and 47 are aligned allowing string 23 to pass through locking device 40.

Opening 15 of container 10 is closed by pressing button 46 and pulling draw string 23 to constrict strip 21 against the biasing force of cords 24, as shown in FIG. 3. Locking device 40 is positioned adjacent strip 21 and button 46 is released to engage string 23 thereby holding the container 10 in the closed position. To open container 10 button 46 is depressed to allow cords 24 to pull strip 21 radially outward towards ring 16. String 23 slides through locking device 40 thereby increasing the size of opening 15. This allows fish to be quickly and easily placed into the container 10. Loss and damage of fish are avoided. Also, only one hand of the fisherperson is needed to release the locking device 40 and open container 10 freeing the other hand for handling of the fish. After the fish is placed into the container string 23 is pulled tight and locking device 40 is repositioned adjacent strip 21 to enclose the fish in the container.

As shown in FIGS. 1 to 4, a swivel 66 is connected to a ring 67 located about upper ring 16. Ring 67 is a split ring turned on a ring of swivel 66. Swivel 66 is preferably a conventional quick release swivel having a first ring connected to ring 67 and a second ring connected with a manually operable quick release device. In use a line, rope, or chain (not shown) from a boat or dock is tied to the second ring of the swivel to secure fish container 10. The container 10 with the line connected to swivel 66 can be towed in the water. The quick release device is used to disconnect fish container 10 from the boat or dock. Swivel 66 can be a conventional non-releasable double ring device connected to ring 67. A snap hook on the line leading to the boat or dock can be used to connect the line to the swivel.

An example of a fish container has a nylon ⅜ inch mesh fabric with a 20 inch top ring 16 located within the passage of casing 17. Ring 16 has a ½ inch plastic tube surrounded with a 1½ inch foam polypropylene plastic tube. The bottom ring 38 is a ½ inch plastic tube having a 20 inch diameter hemmed into the bottom of the side wall 12 at the outer peripheral edge of bottom wall 13. The opening 15 is surrounded with strip 21 which is expandable to 14 inch diameter and foldable with draw string 23 to a closed position. The side wall 12 has a maximum height of 25 inches. Lift strings 51 are used to raise side wall 12 to a minimum height of 6 inches. Container 10 can be made of other materials and have other dimensions.

While there has been shown and described a preferred embodiment of the floating fish container of the invention it is understood that changes in the structure, arrangement of structure, and materials may be made by those skilled in the art without departing from the invention. The invention is defined in the following claims.

We claim:

1. A fish holding apparatus comprising: a container of open mesh fabric having a bottom wall, a generally cylindrical flexible side wall, having an upper end and a lower end, and an expandable flexible top wall with an inner portion having a generally central opening, said walls surrounding a chamber for retaining fish, annular casing means surrounding the top wall secured to said top wall and upper end of the side wall, said casing means having a passage, a top ring having buoyant material located in said passage adapted to retain the top of the container adjacent the surface of a body of water, a flexible band secured to the inner portion of the top wall surrounding said opening, said band being foldable to close said opening, elongated string means movably mounted on said band operable to contract the band and move the top wall to close said opening, lock means mounted on the string means engagable with the band to hold the string means and retain the top wall in position to close said opening, said lock means being releasable from the string means whereby the band and top wall can be moved to open the opening therein, biasing means connected to the band and top ring operable to bias the top wall in a direction to open the opening therein when the lock means is released whereby fish can be placed into and removed from the chamber of the container, a bottom ring surrounding the bottom wall secured to said bottom wall and lower end of the side wall, and adjustable means mounted on the side wall for moving the side wall between an extended position and a retracted position whereby the height of the container can be adjusted.

2. The apparatus of claim 1 wherein: the top ring includes a first circular rigid member and a second circular member surrounding the first member, and second member being buoyant material adapted to retain the top of the container adjacent the surface of a body of water.

3. The apparatus of claim 1 wherein: said band has a plurality of spaced holes along the length of the band, said string means being threaded through said holes.

4. The apparatus of claim 1 wherein: the biasing means comprises a plurality of elastic cords circumferentially spaced about said band, each cord having an outer end attached to the top ring and an inner end attached to the band, said cords being stretched when the opening in the top wall is closed whereby when the lock means for holding the string means is released the elastic cords move the band radially outward to open the opening in the top wall.

5. The apparatus of claim 1 wherein: the adjustable means comprises a plurality of strings attached to the side wall, the strings being operable to move the side wall between the extended position and the retracted position, and locking means mounted on each string for holding the string and retaining the side wall in the retracted position, the locking means being releasable from the string to move the side wall to move to the extended position.

6. The apparatus of claim 1 wherein: said bottom ring has a diameter generally the same as the diameter of the top ring.

7. The apparatus of claim 1 including: handle means secured to said bottom wall.

8. The apparatus of claim 1 including: means attached to the bottom wall adapted to be connected to an anchor.

9. A fish holding apparatus comprising: a container having a bottom wall, a side wall, and a top wall with an opening, a top ring surrounding the top wall and secured to a portion of the container, biasing means connected to the top wall and top ring to bias the top wall in a direction to open the opening therein, string means attached to the top wall of the container operable to move the top wall from the open position to a closed position, and means mounted on the string means for holding the string means and retaining the top wall in the closed position, the means mounted on the string means being releasable to allow the biasing means to move the top wall to the open position whereby fish can be placed into and removed from the container.

10. The apparatus of claim 9 including: adjustable means mounted on the side wall for moving the side wall between an extended position and a retracted position.

11. The apparatus of claim 10 wherein: the adjustable means comprises a plurality of strings attached to the side wall, the strings being operable to move the side wall between the extended position and the retracted position, and locking means mounted on each string for holding the string and retaining the side wall in the retracted position, the locking means being releasable to allow the side wall to move to the extended position.

12. The apparatus of claim 9 wherein: the biasing means comprises a plurality of elastic cords extending between said top ring and inner portions of the top wall of the container.

13. The apparatus of claim 9 wherein: the top ring includes an annular member of buoyant material adapted to retain the top of container adjacent the surface of a body of water.

14. The apparatus of claim 9 wherein: the top ring includes a first circular rigid member and a second circular member surrounding the first member, said second member being buoyant material adapted to retain the top of the container adjacent the surface of a body of water.

15. The apparatus of claim 1 wherein: the top wall has a continuous flexible strip surrounding the opening, said biasing means being connected to said strip and top ring to bias the strip radially outward to open the opening.

16. The apparatus of claim 15 wherein: said string means is movably mounted on the strip.

17. The apparatus of claim 15 wherein: said strip has a plurality of spaced holes along the length thereof, said string means being threaded through said holes, said means mounted on the string means for holding the string means being engagable with the strip to maintain the opening in the top wall closed.

18. The apparatus of claim 9 wherein: the biasing means comprises a plurality of elastic cords circumferentially spaced about said strip, each cord having an outer end attached to the top ring and an inner end attached to the strip, said cords being stretched when the opening in the top wall is closed whereby when the means for holding the string means is released the elastic cords moves the strip radially outward to open the opening in the top wall.

19. The apparatus of claim 9 including: a bottom ring surrounding the bottom wall and secured to a lower end portion of the side wall.

20. The apparatus of claim 9 wherein: said bottom ring has a diameter generally the same as the diameter of the top ring.

21. The apparatus of claim 9 including: handle means secured to said bottom wall.

22. The apparatus of claim 9 including: means attached to the bottom wall adapted to be connected to an anchor.

23. A fish holding apparatus comprising: a container of open mesh fabric having a bottom wall, a flexible side wall, and a top wall with a generally central opening, said wall surrounding a chamber for retaining fish, a top ring having buoyant material secured to an upper portion of the side wall adapted to retain the top of the container adjacent the surface of a body of water, a bottom ring surrounding the bottom wall secured to said bottom wall and lower end of the side wall, and adjustable means mounted on the side wall for moving the side wall between an extended position and a retracted position; the adjustable means comprises a plurality of strings attached to the side wall, the strings being operable to move the side wall between the extended position and the retracted position, and locking means mounted on each string for holding the string and retaining the side wall in the retracted position, said locking means being releasable from the string to allow the side wall to move to the extended position.

24. The apparatus of claim 23 wherein: the top ring includes a first circular rigid member and a second circular member surrounding the first member, said second member being buoyant material adapted to retain the top of the container adjacent the surface of a body of water.

25. The apparatus of claim 23 wherein: said bottom ring has a diameter generally the same as the diameter of the top ring.

26. The apparatus of claim 23 wherein: each string has a lower end secured to the side wall, and an elongated vertical portion threaded into and out of the side wall, said locking means being engagable with the side wall when the side wall is in the retracted position.

27. The apparatus of claim 23 including: means attached to the bottom wall adapted to be connected to an anchor.

28. A fish holding apparatus comprising: a container of open mesh fabric having a bottom wall, a flexible side wall having an upper end and a lower end, and an expandable flexible top wall with an inner portion having a generally central opening, said walls surrounding a chamber for retaining fish, annular casing means surrounding the top wall secured to said top wall and upper end of the side wall, said casing means having a passage, a top ring having buoyant material located in said passage adapted to retain the top of the container adjacent the surface of a body of water, a flexible band secured to the inner portion of the top wall surrounding said opening, said band being foldable to close said opening, biasing means connected to the top wall and top ring for expanding and contracting said opening, elongated string means movably mounted on said band operable to contract the band and move the top wall to close said opening, lock means mounted on the string means engagable with the band to hold the string means and retain the top wall in position to close said opening, said lock means being releasable means whereby the band and top wall can be moved to open the opening therein, and a bottom ring surrounding the bottom wall secured to said bottom wall and lower end of the side wall.

29. The apparatus of claim 28 wherein: the top ring includes a first circular rigid member and a second circular member surrounding the first member, said second member being buoyant material adapted to retain the top of the container adjacent the surface of a body of water.

30. The apparatus of claim 28 wherein: said bottom ring has a diameter generally the same as the diameter of the top ring.

31. The apparatus of claim 28 wherein: said band has a plurality of spaced holes along the length of the band, said string means being threaded through said holes.

32. The apparatus of claim 28 including: handle means secured to said bottom wall.

* * * * *